Patented Oct. 6, 1942

2,297,709

UNITED STATES PATENT OFFICE 2,297,709

HOT-MELT COATING COMPOSITION COMPRISING CELLULOSE ETHERS

Toivo A. Kauppi and Earle L. Kropscott, Midland, Mich., assignors to The Dow Chemical Company, Midland, Mich., a corporation of Michigan No Drawing. Application May 16, 1939, Serial No. 273,965

3 Claims. (Cl. 106—173)

This invention relates to coating compositions comprising cellulose ethers, and especially to such compositions which comprise water-insoluble and organo-soluble lower alkyl ethers of cellulose, wax and a compatible non-oxidizing, non-setting resin, the said compositions being suitable for application from a molten condition. Such compositions are herein referred to as hot-melts.

The present application is a continuation-in-part of our co-pending application, Serial No. 198,832, filed March 30, 1938, now issued as Patent No. 2,264,316, of December 2, 1941.

Compositions comprising a cellulose derivative, wax and plasticizer, with and without resins and with and without mutual solvents, have been employed heretofore to coat paper, cloth, metal and structureless foils. When deposited from solution, these compositions tend to retain at least traces of the solvent and do not dry readily. Drying time is of major importance in a paper coating operation as the coated sheets must be capable of being stacked without sticking together. Solvent costs are high as solvent coating methods either permit total loss of solvent or require expensive recovery systems.

The prior art has failed to distinguish clearly between the individual adaptability of the various types of cellulose derivatives to the above type of moisture-proofing composition. In many instances, cellulose ethers, esters, and nitrate have been listed as equivalents for the purpose. Further, no distinction appears to have been made between the utility of various of the cellulose ethers in the compositions. Thus, benzyl cellulose and ethyl cellulose have been grouped as equivalents. Similarly, the art has commonly regarded various types of waxes as equivalents in the preparation of coating compositions to be applied to paper, cloth, regenerated cellulose, gelatin-foil, metal foil, and similar sheet-like material for moisture-proofing, decorative, and protective purposes. For example, the mineral waxes, such as paraffin, ceresin, and ozokerite, have been grouped together with the ester-type waxes, of which spermaceti, montan, carnauba, and beeswax are examples. No distinction has been made between the effects of these distinct classes of materials on the properties of the composition, and it has been stated that suitable compositions can be made from "a cellulose derivative, resin, plasticizer and wax." Many hot-melt compositions comprising such ingredients are non-homogeneous or so highly viscous that they cannot be spread readily onto the material to be coated, except at temperatures which partially decompose and discolor the compositions.

It has long been desired to provide a coating composition capable of being applied to paper, cloth, foils, metals, and the like, to produce a smooth, uniform, substantially moisture-impermeable, flexible coating which is non-tacky, non-blushing, and non-"blocking." The expression "blocking" is employed in the trade to designate a condition wherein the coated sheets adhere to one another, when they are stacked together, so that they cannot be separated without pulling away part of the coating. The above-mentioned properties are preferably retained at temperatures up to as high as 50° C. and as low as —10° C., i. e., at any temperatures to which the coated article may reasonably be exposed.

In order that compositions be adapted to application from a molten condition and be suitable for coatings of the aforesaid desired type, it is necessary that several conditions be satisfied. In the first place, the melting point of the composition, and hence the minimum satisfactory temperature of application, should not be so high as to expel the moisture normally present in paper or foil to which the coating may be applied. All paper, regenerated cellulose, cloth, and the like, contains a certain amount of moisture, generally in equilibrium with the moisture content of the air. If this moisture is entirely removed from paper or the like, the paper becomes brittle and worthless for wrapping and similar purposes. If the paper is dehydrated from one side only, it not only becomes brittle but tends to warp and wrinkle. Many coatings which have been applied at temperatures substantially above 100° C. have resulted therefore in worthless, misshapen articles. The coating composition should melt at or below 100° C.

A second major consideration is the viscosity of the composition. When a hot-melt coating is applied to a sheet or foil, suitably by means of a roller which dips into a bath of the composition, it is usually distributed as uniformly as possible by means of a scraper or doctor blade. Occasionally such coatings are not smooth enough for many purposes, and must be made more uniform before they are acceptable. To effect the desired change, it is the practice in the paper-waxing art to pass the coated paper over a hot roller, where the coating is softened enough to flow uniformly over the paper. If the coating composition has a viscosity above about 3000 centipoises at the preferred temperature of application, i. e. not to exceed about 105° C., it will not flow enough during the doctor-blade treatment to provide a smooth, glossy coating.

A third consideration to be kept in mind is that, in selecting operating conditions, it is necessary to avoid any prolonged heating at temperatures which will degrade or discolor any of the components of the melt. For this reason, again, temperatures not much in excess of 100° C. are preferred, and the upper limit of melting points of useful compositions is again defined. Since the desired compositions can most advantageously be applied by those firms which are familiar with the paper-waxing art, and which have apparatus available for that purpose, the composition should preferably melt and have a low viscosity at a temperature below that of low pressure steam for which paper-waxing machines are adapted. Again we find a temperature in the range from 100° to 105° C. to be the upper practical limit.

It is an object of the present invention to provide a coating composition which may be applied to paper, cloth, structureless foil, metal foil, and the like, without the use of volatile solvents, and at such moderate temperatures that the operation may, if desired, be carried out in standard paper-waxing apparatus. It is a further object to provide such a composition which, when applied to the aforesaid type of material, provides a thin, smooth, uniform substantially moisture-impermeable, flexible coating which is non-tacky at ordinary temperature, non-blushing, and non-blocking, and which has no tendency to shrink, check, or to produce an "orange-peel" effect on the coated surface. It is another object to provide a coating which will retain these properties even at temperatures up to about 50° C. and as low as −10° C.

We have found that, of all the various film-forming cellulose derivatives, only the water-insoluble alkyl ethers of cellulose are adapted to produce compositions satisfying the foregoing objects with any degree of consistency, and that these may be used only within certain definite limits of concentration. Cellulose nitrate, cellulose esters, and aralkyl ethers of cellulose have at best only very limited compatibility with wax, or wax-resin mixtures, and cannot be substituted for the alkyl ethers of cellulose in our compositions.

In the aforesaid co-pending application, Serial No. 198,832, has been described a composition suitable for application as a hot-melt and comprising the following ingredients:

|  | Percent by weight |
|---|---|
| Water-insoluble cellulose lower alkyl ether | 5–20 |
| Ester wax | 30–80 |
| Compatible plasticizer | 5–20 |
| Mineral wax | 5–30 |

The said composition is characterized by having a viscosity below 3000 centipoises at 105° C. and by its ability to deposit from the molten condition a non-tacky, non-blocking, flexible, non-blushing coating of high moisture impedance. A fifth and optional component mentioned in the said co-pending application consisted of a compatible non-oxidizing, non-setting resin. The four components deemed essential to the composition of the prior application are the cellulose ether, ester wax, plasticizer and mineral wax.

We have now found that the stated and further objects may be attained by employing as the coating composition a four component system consisting of a lower alkyl ether of cellulose, a non-oxidizing, non-setting resin, an ester wax and a mineral wax. The new composition is preferably free from any of the customary plasticizers for cellulose ethers, inasmuch as these plasticizers have now been found to detract from the moisture impedance of surface coating films deposited from hot-metal compositions. The composition of the present invention comprises the following ingredients in the proportions stated:

|  | Per cent by weight |
|---|---|
| Water-insoluble cellulose lower alkyl ether | 5–20 |
| Ester wax | 25–55 |
| Compatible non-oxidizing, non-setting resin | 15–40 |
| Mineral wax | 15–30 |

A water-insoluble lower alkyl ether of cellulose suitable for our compositions should have an upper viscosity limit of about 40 centipoises, when measured in a 5 per cent solution by weight in a solvent consisting of 80 parts of toluene and 20 parts of ethanol, by volume, or 30 seconds, when measured in a 20 per cent solution in the above solvent by the falling-ball method (A. S. T. M. D301–33). The proportion of cellulose alkyl ether in the melt may range from about 5 to about 20 per cent, preferably between 5 and 15 per cent. Greater amounts of ether give too high a viscosity and too great a moisture transmission in the composition, and lesser amounts give brittle, too waxy coatings.

Waxes suitable for the compositions are selected from the following groups: (a) the true waxes, i. e. the esters of high molecular weight monohydric alcohols and higher fatty acids, examples of which are spermaceti, carnauba, montan, beeswax, Japan wax, Chinese insect wax, etc.; (b) synthetic esters of polyhydric alcohols with the higher fatty acids, e. g. 12-hydroxy stearin, glycol stearate, diethylene glycol laurate, etc.; (c) high melting point fats, such as tallow (ordinarily used in conjunction with one of the other types); (d) synthetic esters of monohydric alcohols with the higher fatty acids, e. g. phenoxy ethyl stearate, lauryloxyethyl laurate, palmitic and stearic esters of the alcohols obtained by reducing palm or sperm oil fatty acids; (e) monohydric alcohols from the hydrogenation of natural oil fatty acids; and (f) monohydric alcohols from the saponification of waxes, such as myricyl alcohol, cetyl alcohol, and ceryl alcohol. The proportion of such ester wax should be between 25 and 55 per cent, preferably between 30 and 50 per cent, of the composition. When more than about 50 per cent of wax is employed, the composition becomes brittle and characteristically waxy. When less than about 25 to 30 per cent of wax is employed, the viscosity of the composition is not low enough to be satisfactorily applied as a melt. The wax should have a melting point between 40° and 100° C., and preferably between 60° and 80° C. Higher melting ester waxes form brittle compositions, while those with lower melting points yield tacky films which do not pass the "block" tests. For some purposes the composition may advantageously contain more than one ester wax. The preferred ester wax is a hydrogenated castor oil wax having a melting point above 50° C. Such waxes include one known commercially as "Opal Wax" which is substantially pure 12-hydroxy stearin.

Another of the essential components in the composition of the present invention is a compatible non-oxidizing, non-setting resin, i. e. one which is not oxidized and does not set under the conditions of application of the melt. It should not become insoluble in the melt when the latter is held at temperatures of 90°–150° C. for periods of from 2 to 3 hours. Examples of suitable types of resins include dewaxed dammar gum, ester gum, rosin, slot-setting or non-setting alkyds, modified alkyds, oil-soluble phenol formaldehyde resin, and modification products of the latter. Any resins which fall into one of these classes or a mixture of two or more of them which is compatible with other ingredients of the melt may be used in the present compositions, but it is preferred to employ soft resins as they will form more flexible coatings. Specific examples of resins which may be used are: a pure phenolic resin, known commercially as "Super-Beckacite 2000," modified alkyds such as those known commercially as "Lewisol 2L" and "Amberol 800," esterified rosins having acid numbers generally in the range from 4 to 6, and softening points in the range from 80° to 95° C. such as those known commercially as "Ester Gum No. 5" and "Ester Gum No. 6," natural resin modified alkyds such as that known commercially as "Paranol No. 100," and the like. The resinous constituent of the composition contributes several of the desired characteristics as it promotes adhesion of the melt when applied to metal foils, cellulose acetate film, regenerated viscose sheet, glassine paper, or highly coated or sized smooth surfaced papers. The resin also contributes gloss and heat-sealing properties. The proportion of resin employed in the herein-described compositions is from 15 to 40 per cent by weight of the mixture.

The fourth essential component of the new composition is a mineral wax in quantity varying from 15 to 30 per cent by weight of the melt. Mineral waxes which may be employed include paraffin, ceresin, or ozokerite having melting points above 40° C. The mineral wax serves as a diluent which reduces the viscosity of the melts as well as increasing the moisture impedance of coating films deposited from the molten composition. The ratio of mineral wax to ester wax may be employed will vary depending upon the compatibility of the cellulose ether in the particular range of proportions employed. Generally speaking a melt containing the stated preferred proportions of ester wax and of mineral wax and the compatible resin of the present compositions will dissolve the cellulose ether to form melt compositions of the stated desired proportions. When 12-hydroxy stearin is employed as the ester type waxy material, paraffin can only be added up to about 0.6 part of the latter per part of the hydrogenated castor oil.

If desired, mixtures of mineral waxes may be employed as the mineral wax component of the composition and similarly mixtures of ester waxes may be employed as the ester wax component. The resinous component of the mixture may comprise one or more of the resins previously defined and it has been found that particularly desirable coatings are obtained if mixtures of pure phenol resins, such as "Super-Beckacite 2000" with one or more other types of resins, are employed. The compositions may be colored by means of soluble dyes or dispersed pigments if desired.

The entire composition, when made up of the above stated ingredients in the range of proportions specified, has a viscosity lower than 3000 centipoises when measured at a suitable temperature of application, i. e. about 100°–105° C.

The new compositions are applicable to the coating of paper, transparent films, metallic foils, and other sheet materials. They give moisture resistant, non-blocking, glossy coatings with excellent heat-sealing properties. Moisture permeability of the present compositions applied as coatings is much lower than that of any other melt heretofore employed, material advantage accruing to the present composition through the omission of the customary cellulose ether plasticizer. At 0.0003 inch coating thickness, the new melts reduce moisture transmission to a value below 30 grams per square meter per day.

The following example illustrates the practice of our invention:

*Example*

The compositions set forth in the following table were prepared by stirring the indicated quantities of ethyl cellulose in the molten mixtures of other ingredients. The figures in the table refer to per cent by weight of the stated components.

| Ingredient | Amount per cent | | | | |
|---|---|---|---|---|---|
| Ethyl cellulose | 10 | 10 | 10 | 10 | 10 |
| Opal Wax | 25 | 32 | 32 | 44 | 42 |
| Carnauba wax | 2 | 2 | 2 | | 1 |
| Super-Beckacite 2000 | 18 | 18 | 18 | 18 | 18 |
| Ester Gum No. 6 | 15 | | | | |
| Ester Gum No. 5 | | 10 | | | |
| Paranol No. 100 | | | 10 | | |
| Paraffin wax | 30 | 28 | 28 | 28 | 29 |

All these molten compositions were clear and light colored and when applied to paper, ethyl cellulose film, and to metallic foil gave non-blocking, glossy, heat-sealing coatings. These coatings were tested for moisture impedance by the following test:

A little water is placed in a squat-form glass weighing bottle. A piece of the coated material to be tested is sealed over the top of the bottle to form an air-tight closure and the whole assembly is weighed. After standing in a desiccator for 24 hours, the bottle and its contents are reweighed to determine the loss in weight due to transmission of water vapor through the coating composition and this loss is calculated in terms of grams of water transmitted per square meter per 24 hours.

All of the coatings tested at thicknesses of 5 pounds per ream of 3000 square feet, i. e. thickness of 0.0003 inch or more, gave moisture transmission figures of less than 30 grams per square meter per 24 hours. For purposes of comparison, it may be noted that the moisture transmission of uncoated ethyl cellulose film or paper is usually between 1000–1400 grams or more per square meter per 24 hours.

Although we have employed water-insoluble ethyl, propyl, propyl ethyl, methyl ethyl, and butyl cellulose, all of which are satisfactory in our compositions, we prefer to employ "standard" ethyl cellulose (about 47–49% ethoxyl) as the cellulose ether. Of the various waxes employed, we prefer glyceryl tri-(12-hydroxy stearate), i. e. 12-hydroxy stearin, which is a hydrogenated castor oil available to the trade as "Opal Wax." This material, which is substantially insoluble in all common cellulose ether solvents and cannot be used in the solutions employed for the present purpose in the prior art, is compatible with cellulose ethers and readily adapted to use in a "melt" of the type herein described.

Other modes of applying the principle of our invention may be employed instead of those explained, change being made as regards the materials employed, provided the ingredients stated by any of the following claims or the equivalent of such stated ingredients be employed.

We therefore particularly point out and distinctly claim as our invention:

1. A hot-melt coating composition adapted to form non-blocking coatings, consisting of 100 parts of the following ingredients, each in a proportion to constitute a percentage of said 100 parts within the range recited below:

| Ingredient | Range |
|---|---|
| Ethyl cellulose (47–49% ethoxyl) viscosity type below 40 centipoises) | 5 to 20 |
| Hydrogenated castor oil (M. P. above 50° C.) | 25 to 55 |
| Compatible resin selected from the class consisting of rosin, ester gum, dewaxed gum dammar, non-setting alkyl type resins, oil-soluble phenol-formaldehyde resins, and mixtures thereof | 15 to 40 |
| Mineral wax (M. P. above 40° C.) | 15 to 30 | the said composition having a viscosity below 3000 centipoises at about 100° C., and, at coating thicknesses of 0.0003 inch or more, being capable of reducing the moisture transmission of paper to below 30 grams per square meter per day.

2. A hot-melt coating composition adapted to form non-blocking coatings, consisting of 100 parts of the following ingredients, each in a proportion to constitute a percentage of said 100 parts within the range recited below:

| Ingredient | Range |
|---|---|
| Ethyl cellulose (47–49% ethoxyl) viscosity type below 40 centipoises) | 5 to 20 |
| 12-hydroxy stearin | 30 to 50 |
| Compatible resin selected from the class consisting of rosin, ester gum, dewaxed gum dammar, non-setting alkyl type resins, oil-soluble phenol-formaldehyde resins, and mixtures thereof | 15 to 40 |
| Mineral wax (M. P. above 40° C.) | 15 to 30 | the said composition having a viscosity below 3000 centipoises at about 100° C., and, at coating thicknesses of 0.0003 inch or more, being capable of reducing the moisture transmission of paper to below 30 grams per square meter per day.

3. A hot-melt coating composition adapted to form non-blocking coatings, consisting essentially of

| Ingredient | Per cent |
|---|---|
| Ethyl cellulose (47–49% ethoxyl, viscosity type below 40 centipoises) | about 10 |
| 12-hydroxy stearin | about 44 |
| Compatible, oil-soluble phenol-formaldehyde resin | about 18 |
| Paraffin wax (M. P. above 40° C.) | about 28 |

TOIVO A. KAUPPI.
EARLE L. KROPSCOTT.